United States Patent Office 3,308,156
Patented Mar. 7, 1967

3,308,156
PREPARATION OF AMINOBIURET SALTS
Harold T. Gerry, Petersburg, and Jameil Ameen, Hopewell, Va., assignors to Allied Chemical Corporation, New York, N.Y., a corporation of New York
No Drawing. Filed Sept. 3, 1964, Ser. No. 394,332
14 Claims. (Cl. 260—554)

This invention relates to the production of aminobiuret salts. More particularly, it relates to the production of aminobiuret salts by the catalytic reduction of nitrobiuret with hydrogen.

Aminobiuret is useful as an intermediate in the production of hydrazine which is employed as a rocket and missile fuel. It is known to produce aminobiuret (allophanic acid hydrazine) by the reduction of nitrobiuret by zinc and hydrochloric or acetic acid. This method is described in Chemical Reviews, volume 56, page 117 (1956), by Kurzer, who points out that the product is most advantageously isolated in 40–50% yields as the benzal derivative from which aminobiuret may be liberated as the hydrochloride or nitrate by treatment with the appropriate mineral acid. The starting materials of this process as well as the purification procedure necessary to separate the product from metal salts which are also formed are relatively costly.

It is an object of this invention to provide a process for producing aminobiuret salts in high yields. More particularly, it is an object of this invention to produce aminobiuret free from metal salts without resorting to extensive purification procedures, using simple process equipment and relatively inexpensive starting materials.

The objects of the invention are accomplished by the novel process which comprises reacting nitrobiuret with hydrogen at pressure of at least 2000 p.s.i.g. in an aqueous medium in the presence of a rhodium on alumina or a powdered platinum dioxide catalyst and at least an effective amount of oxidizing acid. When the acid is nitric acid this amount is at least 1.2 mols of nitric acid per mol of nitrobiuret, and preferably no more than 3 mols per mol of nitrobiuret, since the use of more than this amount brings no improvement in results.

We have further discovered that especially high yields of aminobiuret, in excess of 80%, may be obtained by using a powdered platinum dioxide catalyst and maintaining a nitric acid:nitrobiuret mol ratio of about 1.3:1 to 1.5:1.

When sulfuric acid is used, an acid:nitrobiuret mol ratio in the range 0.4:1 to 6:1 is preferred. Above this range a slight reduction in yield results with no compensating benefits.

The amount of catalyst used is not very critical. About 5 to 10% catalyst based on the weight of nitrobiuret gives excellent results.

The best yields are obtained at hydrogenation pressures within the range 3000–5000 p.s.i.g.

Reaction temperature is not critical, although temperatures in excess of 70° C., should be avoided, since above this temperature decomposition of both nitrobiuret and aminobiuret occurs. The normal reactoin temperature range is 0° to 60° C., while optimum yields are obtained at about 20–35° C.

The following examples will serve to illustrate the significance of this invention, without being intended to limit in any way its scope.

Example 1

A mixture of 5 grams of 1-nitrobiuret, 100 cc. of water, 3 cc. of nitric acid (71% $HNO_3$) and 0.5 gram platinum dioxide powder catalyst is charged to a 300 cc. stainless steel rocking autoclave. The mol ratio of acid to nitrobiuret is about 1.4. The charged autoclave is then flushed twice with hydrogen to remove air. The autoclave is next pressured with hydrogen to 4000 p.s.i.g. The temperature is maintained at about 29° C., by circulating liquid through the autoclave jacket. After one hour, the autoclave is vented to atmospheric pressure and the contents removed. The reaction mixture is filtered to remove catalyst and any other solids from the aqueous aminobiuret nitrate solution. The solids are washed with water to recover additional aminobiuret salt in aqueous solution. To recover the salt the solutions are combined and evaporated to dryness below 100° C., leaving as residue 1-aminobiuret. Of the original 1-nitrobiuret, 83.3% is converted to 1-aminobiuret nitrate.

Example 2

Repeating the process of Example 1, using 6.5 grams nitric acid and an initial reaction temperature of 25° C., the yield of aminobiuret is 77.8%.

Example 3

Repeating the process of Example 1, but using 1 cc. of 96% $H_2SO_4$ and initial temperature of 26° C., a yield of aminobiuret sulphate of 70.3% is obtained after 80 minutes.

Example 4

Repeating the process of Example 3, but using 2.5 cc. of $H_2SO_4$ and an initial temperature of 27° C., a yield of aminobiuret sulphate amounting to 72.5% is obtained after 60 minutes.

Example 5

Repeating Example 4, but using 5.8 cc. $H_2SO_4$ and an initial temperature of 23° C., a yield of aminobiuret sulphate amounting to 70.4% is obtained after 62 minutes.

Example 6

Repeating Example 5 but using 1 gram of 5% rhodium on alumina as catalyst, 11 cc. $H_2SO_4$ and an initial temperature of 29° C., a yield of amino biuret sulphate amounting to 70.5% is obtained after 66 minutes.

Repeating the process of Example 1 but omitting one of the conditions of the present invention significantly lower yields are obtained as shown in the following table. In each of the runs 5 grams of nitrobiuret and 100 cc. of water are used.

TABLE

| Catalyst | Amount of Catalyst (g.) | Acid | Mol Ratio Acid:Nitrobiuret | Initial $H_2$ pressure, p.s.i.g. | Initial Temp., ° C. | Time, Mins. | Yield Mol Percent Aminobiuret |
| --- | --- | --- | --- | --- | --- | --- | --- |
| 5% Pt. on Alumina | 1 | $HNO_3$ | 3:1 | 4,000 | 28 | 50 | 15.0 |
| $PtO_2$ | 0.5 | $H_2SO_4$ | 3:1 | 1,000 | 29 | 65 | 32.6 |
| $PtO_2$ | 0.5 | $HNO_3$ | 0.7:1 | 4,000 | 25 | 60 | 62 |
| 5% Pd. on Carbon | 1 | $H_2SO_4$ | 3:1 | 4,000 | 29 | 48 | 13.8 |

We claim:
1. A process for the production of aminobiuret salts which comprises reacting nitrobiuret with hydrogen at a pressure of at least 2000 p.s.i.g. in an aqueous medium in the presence of a catalyst selected from the group consisting of rhodium on alumina and powdered platinum dioxide and an effective amount of an oxidizing acid.

2. The process of claim 1 wherein the oxidizing acid is selected from the group consisting of nitric acid and sulfuric acid.

3. The process of claim 2 wherein the ratio of mols of acid per mol of nitrobiuret is in the range 1.2:1 to 3:1 when nitric acid is used and 0.4:1 to 6:1 when sulfuric acid is used.

4. The process of clam 3 wherein the reaction is carried out at a temperature of 20 to 35° C., for a period of about 45 to 80 minutes.

5. The process of claim 4 wherein the hydrogen pressure is maintained within the range of 3000 to 5000 p.s.i.g.

6. A process for the production of aminobiuret salt which comprises reacting nitrobiuret with hydrogen at a pressure of at least 2000 p.s.i.g. in an aqueous medium in the presence of a powdered platinum dioxide catalyst and sufficient nitric acid to provide a nitric acid:nitrobiuret mol ratio of at least 1.2:1.

7. A process for the production of 1-aminobiuret salt which comprises reacting nitrobiuret with hydrogen under a pressure of at least 2000 p.s.i.g. in an aqueous medium containing about 1.2–3 mols nitric acid per mol of nitrobiuret in the presence of a powdered platinum dioxide catalyst.

8. The process of claim 7 wherein the reaction is carried out at a temperatrue of 20–35° C. for a period of about 45–80 minutes.

9. A process for the production of 1-aminobiuret salt which comprises reacting nitrobiuret in an aqueous medium with hydrogen under a pressure of at least 2000 p.s.i.g. in the presence of a powdered platinum dioxide catalyst and sufficient nitric acid to provide a nitric acid:nitrobiuret mol ratio of 1.3:1 to 1.5:1.

10. The process of claim 9 wherein the reaction is carried out at a temperature of 20–35° C. for a period of 45–80 minutes.

11. The process of claim 10 wherein the hydrogen pressure is maintained at about 4000 p.s.i.g.

12. The process of producing 1-aminobiuret which comprises mixing 5 parts by weight 1-nitrobiuret with 100 parts water; 3 parts nitric acid and 0.5 part powdered platinum dioxide, introducing hydrogen under a pressure of about 4000 p.s.i.g. and maintaining the resulting mixture at a temperature of about 28–30° C. for about 1 hour.

13. A process for the production of aminobiuret salt which comprises reacting nitrobiuret with hydrogen at a pressure of at least 2000 p.s.i.g. in the presence of a catalyst selected from the group consisting of rhodium on alumina and powdered platinum dioxide and at least 0.4 mol sulfuric acid per mol of nitrobiuret.

14. The process of claim 13 wherein the catalyst is powdered platinum dioxide and the sulfuric acid is present in an amount ranging from 0.4 to 6 mols per mol of nitrobiuret.

No references cited.

ALEX MAZEL, *Primary Examiner.*

HENRY R. JILES, *Assistant Examiner.*